(12) United States Patent
Lohner et al.

(10) Patent No.: US 8,918,539 B2
(45) Date of Patent: *Dec. 23, 2014

(54) PROVISIONING TOOL FOR USE IN A DISTRIBUTED COMPUTER NETWORK

(71) Applicant: Akamai Technologies, Inc., Cambridge, MA (US)

(72) Inventors: Martin Lohner, Melrose, MA (US); Nathaniel A. Kushman, Boston, MA (US); Todd Mitton, Sunnyvale, CA (US); Michael Yurovitsky deceased, Redwood Shores, CA (US); Abhijit Dixit, Sunnyvale, CA (US); Erik L. Nygren, Cambridge, MA (US); Silvina Z. Hanono Wachman, Chestnut Hill, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/924,723

(22) Filed: Jun. 24, 2013

(65) Prior Publication Data

US 2013/0290545 A1 Oct. 31, 2013

Related U.S. Application Data

(63) Continuation of application No. 10/849,331, filed on May 19, 2004, now Pat. No. 8,473,635.

(60) Provisional application No. 60/471,679, filed on May 19, 2003.

(51) Int. Cl.
*G06F 15/16* (2006.01)
*H04L 29/12* (2006.01)
*H04L 12/24* (2006.01)

(52) U.S. Cl.
CPC ............ *H04L 41/22* (2013.01); *H04L 61/2015* (2013.01); *H04L 61/303* (2013.01); *H04L 61/1511* (2013.01)
USPC .......................................... 709/245; 709/218

(58) Field of Classification Search
USPC .................................................. 709/245, 218
See application file for complete search history.

(56) References Cited

U.S. PATENT DOCUMENTS 8,224,994 B1 * 7/2012 Schneider ..................... 709/245
2002/0010798 A1 * 1/2002 Ben-Shaul et al. ........... 709/247
2005/0144323 A1 * 6/2005 Gardos et al. ................. 709/245

* cited by examiner

*Primary Examiner* — Asghar Bilgrami
(74) *Attorney, Agent, or Firm* — David H. Judson

(57) ABSTRACT

A tool that allows a CDN customer, partner, or other authorized entity to create a DNS canonical name (CNAME) on the content delivery network without having to contact the content delivery network service provider directly.

10 Claims, 6 Drawing Sheets

PROVISIONING TOOL FOR USE IN A DISTRIBUTED COMPUTER NETWORK

BACKGROUND

1. Technical Field

This disclosure relates generally to techniques for content delivery.

2. Description of the Related Art

It is known in the art for a content provider to outsource its content delivery requirements to a content delivery network (a "CDN"). A content delivery network is a collection of content servers and associated control mechanisms that offload work from Web site origin servers by delivering content on their behalf to end users. A well-managed CDN achieves this goal by serving some or all of the contents of a site's Web pages, thereby reducing the customer's infrastructure costs while enhancing an end user's browsing experience from the site. For optimal performance, the CDN service provider may maintain an objective, detailed, real-time view of the Internet's topology, reliability, and latency, and this view may then be used to power a dynamic DNS-based system to direct end users to the best CDN server to handle a particular request.

In some known content delivery networks, DNS canonical names (CNAMEs) are sometimes used to provide a level of indirection between customer hostnames and CDN service provider-specific information used to enable the service for the customer. To give a concrete example, for customer domain "www.customer.com," the CDN service provider may create a CNAME like "www.customer.com.edgeservice.net CNAME g.cdnsp.net". The customer would then create a CNAME for its domain name into the service.net domain, such as: "www.customer.com CNAME www.customer.com.edgeservice.net". Known methods for provisioning CNAMEs are either highly manual or are not monitored and prone to problems. Customers are unable to provision their own CNAMEs and typically must rely on professional services consultants, who must then create the CNAMEs by hand-editing files or other, inefficient means.

BRIEF SUMMARY

The subject matter herein describes a tool that allows a CDN customer, partner, or other authorized entity to create a CNAME on the content delivery network without having to contact the content delivery network service provider directly.

In an illustrative embodiment, a system is described for provisioning DNS canonical names for use in a distributed network on behalf of given entities that use the distributed network. The distributed network preferably is managed by a given service provider. The system comprises a graphical user interface, together an application programming interface (API) that exports a set of methods that enable a given entity, using the graphical user interface and without direct involvement by the service provider, to create, delete and/or edit a canonical name for use in the distributed network.

According to another aspect of the invention, a system is described for provisioning DNS canonical names in a distributed network on behalf of given entities that use the distributed network. The distributed network preferably is managed by a service provider and includes a set of one or more name servers. According to this aspect, the system comprises a first subsystem, together with a second subsystem. The first subsystem is used by given entities that use the distributed network to identify canonical name change requests. A given canonical change request is associated with a given action selected from a set of actions that include creating, editing and deleting canonical names that are used in the distributed network. The second subsystem receives from the first subsystem given information and, upon validation, provides the given information to the one or more name servers to effect to change requests.

The foregoing has outlined some of the more pertinent features of the disclosed subject matter. These features should be construed to be merely illustrative. Many other beneficial results can be attained by applying the disclosed subject matter in a different manner or by modifying the invention as will be described.

DETAILED DESCRIPTION OF AN EMBODIMENT

By way of background, it is known to deliver digital content (e.g., HTTP content, streaming media and applications) using an Internet content delivery network (CDN). A CDN is a network of geographically distributed content delivery nodes that are arranged for efficient delivery of content on behalf of third party content providers. Typically, a CDN is implemented as a combination of a content delivery infrastructure, a request-routing mechanism (preferably based in DNS), and a distribution infrastructure. The content delivery infrastructure usually comprises a set of "surrogate" origin servers that are located at strategic locations (e.g., Internet network access points, Internet Points of Presence, and the like) for delivering content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. An effective CDN serves frequently accessed content from a surrogate that is optimal for a given requesting client. In a typical CDN, a single service provider operates the request-routers, the surrogates, and the content distributors. In addition, that service provider establishes business relationships with content publishers and acts on behalf of their origin server sites to provide a distributed delivery system.

Figure 1:
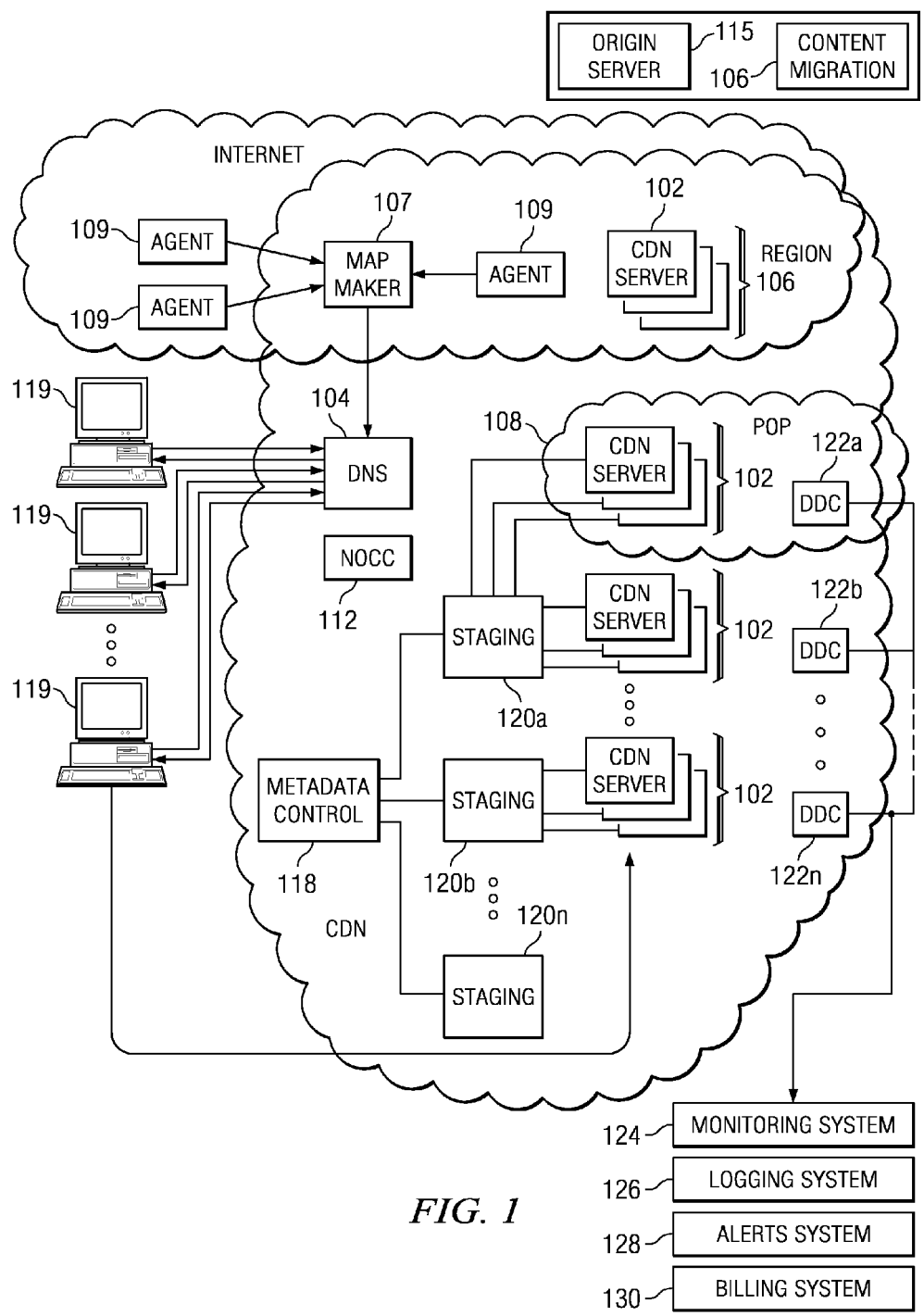
FIG. 1 is a block diagram of a known content delivery network in which the subject matter herein may be implemented.

As seen in FIG. 1, an Internet content delivery infrastructure usually comprises a set of "surrogate" origin servers 102 that are located at strategic locations (e.g., Internet network access points, and the like) for delivering copies of content to requesting end users 119. A surrogate origin server is defined, for example, in IETF Internet Draft titled "Requirements for Surrogates in the HTTP" dated Aug. 9, 2000, which is incorporated herein by reference. The request-routing mechanism 104 allocates servers 102 in the content delivery infrastructure to requesting clients. Typically, the request routing mechanism 104 is implemented within, or as an adjunct to, a DNS subsystem that is managed by the CDN service provider. A representative CDN of this type is described, for example, in U.S. Pat. No. 6,553,413. The distribution infrastructure consists of on-demand or push-based mechanisms that move content from the origin server to the surrogates. A CDN service provider (CDNSP) may organize sets of surrogate origin servers as a group or so-called "region" or cluster. In this type of arrangement, a CDN region typically comprises a set of one or more content servers that share a common backend network, e.g., a LAN, and that are located at or near an Internet access point. Thus, for example, a typical CDN region may be co-located within an Internet Service Provider (ISP) Point of Presence (PoP) 108. A representative CDN content server is a Pentium-based caching appliance running an operating system (e.g., Linux, modified Linux, Windows NT, Win2K) and having suitable RAM and disk storage for CDN applications and content delivery network content (e.g., HTTP content, streaming media and applications). Such content servers are sometimes referred to as "edge" servers as they are located at or near the so-called "edge" of the Internet. The CDN typically also includes network agents 109 that monitor the network as well as the server loads. These network agents are typically co-located at third party data centers or other locations. Mapmaker software 107 receives data generated from the network agents and periodically creates maps that dynamically associate IP addresses (e.g., the IP addresses of client-side local name servers) with the CDN regions.

Content may be identified for delivery from the CDN using a tool 106 operated, for example, at a participating content provider server. Tool 106 rewrites embedded object URLs to point to the CDNSP domain. A request for such content is resolved through a CDNSP-managed DNS to identify a "best" region, and then to identify an edge server within the region that is not overloaded and that is likely to host the requested content. A representative operation of this type is described in U.S. Pat. No. 6,108,703. If desired, various customer parameters (such as a content provider code, an object nonce, or the like) may also be encoded into the object URLs that are modified to point to the CDN to facilitate the content delivery process. Instead of using content provider-side migration (e.g., using the tool 106), a participating content provider may simply direct the CDNSP to serve an entire domain (or subdomain) by a DNS alias directive such as a canonical name (a CNAME). In such case, typically the CDNSP provides object-specific metadata to the CDN content servers to determine how the CDN content servers will handle a request for an object being served by the CDN. Metadata, as used herein, refers to a set of control options and parameters for the object (e.g., coherence information, origin server identity information, load balancing information, customer (content provider) code, other control codes, and the like), and such information may be provided to the CDN content servers via a configuration file, in HTTP headers, or in other ways. The Uniform Resource Locator (URL) of an object that is served from the CDN in this manner does not need to be modified by the content provider. When a request for the object is made, for example, by having an end user navigate to a site and select the URL, a customer's DNS system directs the name query (for whatever domain is in the URL) to the CDNSP DNS request routing mechanism. Once an edge server is identified, the browser passes the object request to the server, which applies the metadata supplied from a configuration file, HTTP response headers, or the like, to determine how the object will be handled.

As also seen in FIG. 1, the CDNSP may operate a metadata transmission (MDT) system 116 comprising a set of one or more servers to enable metadata to be provided to the CDNSP content servers. The system 116 may comprise at least one control server 118, and one or more staging servers 120*a-n*, each of which is typically an HTTP server (e.g., Apache). Metadata is provided to the control server 118 by the CDNSP or the content provider (e.g., using a secure extranet application) and periodically delivered to the staging servers 120*a-n*. The staging servers deliver the metadata to the CDN content servers as necessary. As noted above, metadata is per-customer control information for the content delivery service. Metadata may be conveniently expressed as an XML file to allow a given CDN customer the ability to control end user requests and behaviors of the content delivery network upon receipt of a request or response.

The CDN may also include other infrastructure, such as a distributed data query and collection system 122*a-n* that collects usage and other data from the edge servers, aggregates that data across a region or set of regions, and passes that data to other backend systems 124, 126, 128 and 130 to facilitate monitoring, logging, alerts, billing, management and other operational and administrative functions.

The above described content delivery network is merely illustrative. The present invention may leverage any content delivery infrastructure, and there is no requirement that CNAMEs be used in association with customer-specific metadata. Stated another way, the present invention may be used to facilitate CNAME provisioning irrespective of whether the CDN service provider implements metadata handling processes.

Figure 2:
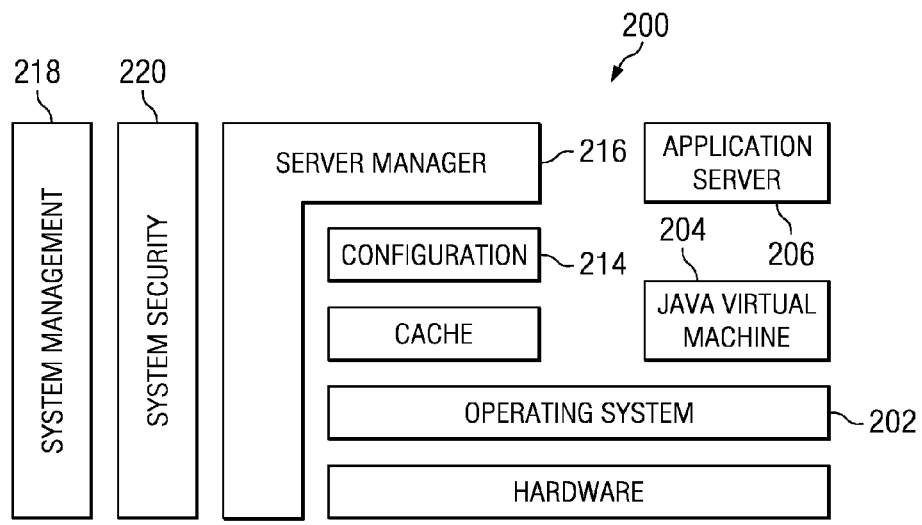
FIG. 2 illustrates a typical machine configuration for a CDN edge server.

FIG. 2 illustrates a typical machine configuration for a CDN content edge server. Typically, the server 200 preferably comprises commodity hardware running an operating system (e.g., a modified form of Linux) 202. The machine may optionally include a Java Virtual Machine (JVM) 204 and an application server 206 to facilitate the execution of one or more customer application or application components 210. For HTTP or streaming media caching, the server 200 implements a cache 212 and maintains customer configuration data 214, typically in the form of customer-specific metadata. A server manager 216 overlays and controls the cache 212, using the customer configuration data. System management 218 and system security 220 modules are also provided to facilitate these and other conventional functions.

As described above, DNS CNAMEs are sometimes used to provide a level of indirection between customer hostnames and CDN service provider-specific information used to enable the service for the customer. To give a concrete example, for customer domain "www.customer.com" the CDN service provider may create a CNAME like "www.customer.com.edgeservice.net CNAME a13.g.cdnsp.net". The customer would then create a CNAME for its domain name into the service.net domain, such as: "www.customer.com CNAME www.customer.com.edgeservice.net". Known methods for provisioning CNAMEs are either highly manual or are not monitored and prone to problems. Customers are unable to provision their own CNAMEs and typically must rely on professional services consultants, who must then create the CNAMEs by hand-editing files or other, inefficient means.

The CNAME provisioning system described here allows customers, CDN service resellers, and permitted others to provision their own CNAMEs. Moreover, the provisioning system gives the CDN service provider permitted users a powerful interface for managing CNAMEs without having to go through complex internal systems. It is also much more robust, the system preferably is monitored and tied into other backend systems such as an alert system. In addition, the CNAME provisioning system supports new complex CNAME configurations, e.g., using geo-based information. The latter feature, for example, allows the CDN service provider to configure a customer's domain to use one domain such as "g.akamai.net" domain for US-based traffic and another domain such as "x.akamai.net" domain for non US-based traffic.

More generally, the tool allows for the provisioning of CNAMEs on the content delivery without necessarily having to contact the CDN service provider directly. Customers create CNAMEs for one or more accounts that are currently under contract with the CDN service provider. Customers preferably access the CNAME tool via a provisioning page on a CDN service provider customer portal. Customers may search for hostnames that have already been created; however, like with the CNAME creation tool, preferably only CNAMEs that are linked with a specific customer account are returned in the search.

High Level Design

Figure 3:
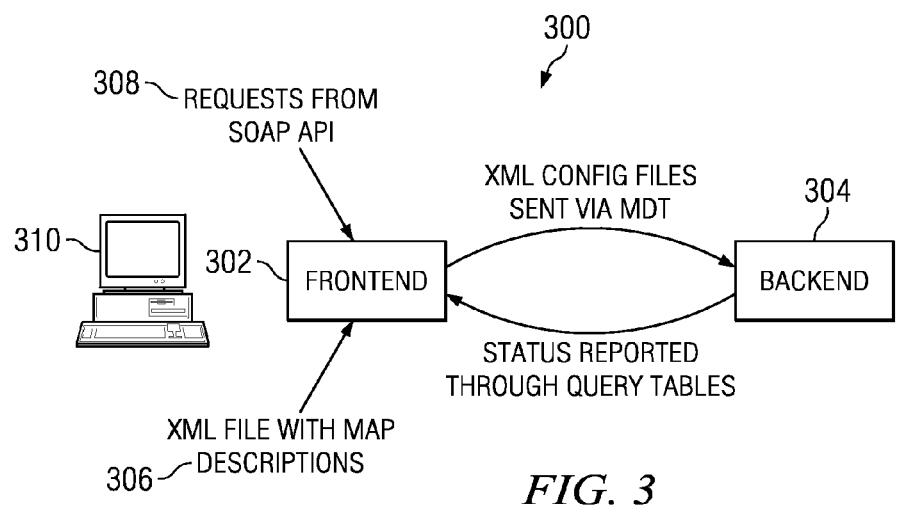
FIG. 3 is a block diagram of the two high level subsystems that comprise the provisioning tool of this disclosure.

As seen in FIG. 3, at a very high level, the CNAME provisioning system 300 has a frontend subsystem 302 and a backend system 304. The frontend subsystem 302 takes requests to create and modify CNAMEs and generates XML configuration files for the back end subsystem 304. The backend subsystem 304 uses these XML configuration files to produce the proper zone db and tree files for upload to a set of top level DNS servers in the CDN service provider's DNS subsystem. The backend subsystem 304 then reports success status to the frontend subsystem 302, which provides status information to the user. In more detail, the main function of the frontend subsystem 302 is to allow entering of CNAME information. In an illustrative embodiment as seen in FIG. 3, there are two main inputs, a mapping.xml file 306 and a SOAP application programming interface (API) 308. The mapping.xml file 306 defines and categorizes a set of available mapping solutions or "map rules" for the various content delivery services being provided by the CDN service provider. The SOAP API 308 provides methods to create, edit, delete, search and get status for CNAMEs. Professional Services consultants as well as customers can use the SOAP API directly. In addition, a secure portal based GUI 310 may be provided on top of the SOAP API, and this portal 310 provides a convenient way to manage CNAMEs. Preferably, only the CDN service provider can modify the mapping solutions information.

One technique for implementing the backend subsystem, as will be described in more detail below, is to use an extended DNS (EDNS) infrastructure that provides a secondary DNS, i.e., a system wherein customers maintain their own DNS zone information on their own "masters" and use EDNS to serve as "secondaries," receiving DNS information via DNS zone transfer. Preferably, the front end sends information to the EDNS backend subsystem via the CDN metadata transport mechanism (such as the mechanism shown in FIG. 1). Based on information gathered through the SOAP API and the mapping.xml file, the frontend generates one or more XML files to be used by the backend. The frontend then packages these files into an appropriate format (e.g., a tarball) and sends the package to the backend. The package preferably contains an XML file for each of the zones used by the various CDN services. The mapping.xml file preferably is also included in the package. Upon receiving a package from the metadata transport mechanism, the EDNS backend goes through a series of tests to validate the information. If successful, the backend subsystem then uploads the zones to the EDNS top level name servers in the CDN DNS subsystem. The backend reports status information through the data collection subssystem. The frontend monitors these tables to provide feedback to users.

The following provides additional details concerning the components of the provisioning tool.

The Portal Frontend Subsystem

Figure 4:
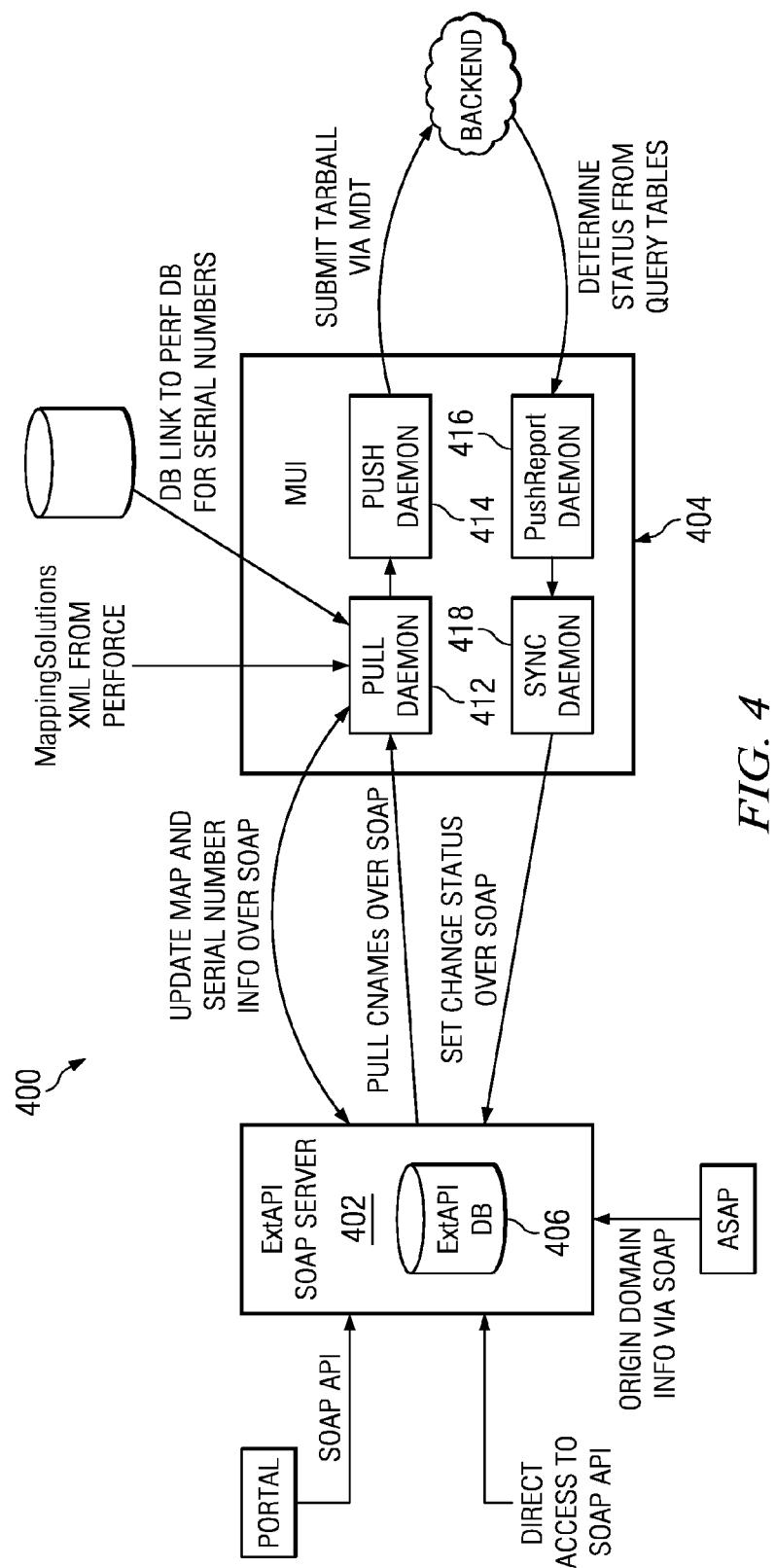
FIG. 4 is a detailed block diagram of the provisioning tool frontend subsystem.

Referring now to FIG. 4, preferably the front end subsystem 400 is made up of two main components: an ExtAPI SOAP server 402 and a metadata user interface (MUI) 404. The ExtAPI SOAP server 402 implements the external SOAP API, which allows users and integration consultants to queue up CNAME change requests. These changes include creating, editing, and deleting CNAMEs in one or more CDN service provider domains. Preferably, the CNAME information is stored in an ExtAPI database 406. MUI 404 periodically polls the ExtAPI SOAP server 402 to see if any CNAME changes have been queued. If changes exist, MUI 404 pulls the CNAME information from the SOAP server 402 using an internal SOAP API. MUI 404 then generates the XML configuration files needed by the backend system and submits them as a package (e.g., a tarball) to the metadata transport system (MDT). MUI 404 then monitors the status of the package through a query mechanism as new DNS zones are loaded by the backend subsystem. MUI 404 updates the SOAP server 402 with the status of the CNAME changes. CDN customers, employees and permitted others can use the external SOAP APIs to get the status of their changes.

ExtAPI SOAP Server

The SOAP APIs used to manage CNAMEs are served from the ExtAPI SOAP server 402. The ExtAPI server may also support other SOAP APIs besides the CNAME APIs. Examples of these are the APIs used by the CDN for publishing or reporting. The CNAME APIs may be instances of an ExtAPI framework, with access to individual methods controlled with SSL certificates. Thus, preferably users can only invoke methods using certificates that have been granted access to that method. All CNAME information logically lives on the ExtAPI SOAP server and is stored in the ExtAPI database. As noted above, the SOAP APIs allow CDN customers, employees and permitted others to manage CNAMEs used with the CDN services such as object or whole site content delivery, secure content delivery, distributed content storage, and others. The API includes methods to create, edit, bulk edit (change multiple CNAMEs), delete and search for CNAMEs. Methods that queue a change preferably return a change ID. These change IDs can later be used to find out the status of a change. Representative methods are set forth below.

1. Default Values for CNAME Attributes

Preferably, CDN customers only specify the hostname and a comment attribute when creating a CNAME. The CDN service provider may set any attribute of the CNAME. Depending on the service the CNAME is used with, these other attributes include, by way of example only, object TTL, a serial number to facilitate load balancing, a map identifier, a map alias, and so forth. Preferably, the customer does not access these extra attributes, and the API preferably does not provide any indication that the attributes exist. The SOAP APIs take an array of name/value pairs to specify the CNAME attributes. The SOAP API preferably only allows requests using certain certificates to specify the other attributes.

When a customer creates a CNAME, preferably the attributes of the CNAME are automatically determined. Consider the case where a customer creates a CNAME to be used with a content delivery network that provides object or whole site delivery. In this example, the customer gives the hostname "images.foo.com" and a comment "serves images for our foo.com site". The SOAP server then determines default values for all the other attributes needed by an service CNAME. From the information stored in mapping.xml, the SOAP server, for example, assigns a TTL of "6h" and sets the map to "a;x.cdnsp.net" (these values being illustrative only). If serial numbers are used for load balancing, the SOAP server may randomly pick a serial number (e.g., "768") from a list of least loaded serial numbers. The way in which the SOAP server gets the list of least loaded serial numbers is described below. This results in a CNAME being created that maps images.foo.com.edgeservice.net to a768.x.cdnsp.net with a TTL of 21600 seconds. The customer can later check on the status of the images.foo.com CNAME, but preferably the customer is restricted from changing any of the attributes. This is not a requirement. As mentioned above, however, the CDN service provider can change these attributes at any time.

The SOAP server preferably treats default values differently than values that are explicitly set. For the customer created CNAME in the example above, the SOAP server records that the map and the TTL are as specified as the default values in mapping.xml. If the CDN service provider then changes the default TTL for the a;x.cdnsp.net map in mapping.xml, then a change is queued to update all the CNAMEs using the a;x.akamai.net map with the default TTL. If the CDN service provider changes the default map to another name, e.g., a;g.akamai.net, then all CNAMEs using the default map are changed to use a;g.akamai.net. If the CDN service provider explicitly sets the map or TTL, preferably those attributes will no longer be affected by changes to mapping.xml.

2. Queued Changes

In an illustrative embodiment, database tables used to store CNAMEs logically represent a table of "live" CNAMEs and a table of pending changes. The "live" CNAMEs are CNAMEs that are currently loaded into their respective DNS zones. Pending changes can be a change to create a CNAME, a change to delete a CNAME, a change to edit a CNAME, or a change to edit multiple CNAMEs (bulk edit). Each change preferably has an associated change ID, and change IDs may be assigned from a monotonically increasing sequence. Changes can be added to the queue of pending changes preferably with one exception: only CNAMEs that are in the "live" table that are not pending deletion can be edited.

In this illustrative embodiment, MUI periodically asks the SOAP server for the latest change ID to determine if there are pending changes. MUI then uses this change ID information to "pull a change". When MUI pulls a change, the SOAP server sends a list of all CNAMEs to MUI. This list preferably is a list of all the "live" CNAMEs merged with the pending changes. As the list is sent, preferably each pending change up to the specified change is applied to the list. MUI uses this information to generate a package of configuration information for the backend subsystem. At some later time, MUI may update the SOAP server with the status of the change. Preferably, the change status value is inherited by all pending changes with change IDs less than the specified change. For example, if changes 105, 106, 107 and 108 are pending, and MUI pulls change 107 and reports it was successful, then changes 105, 106 and 107 are marked successful and the live table is updated. Change 108 would still be pending.

Preferably, all communication between the ExtAPI SOAP Server and MUI is done using a private SOAP API. Preferably, all requests are initiated by MUI.

3. Validation

The SOAP APIs try to do as much validation as possible. Most validation is fairly straight forward. CNAMEs are checked for illegal characters. TTLs, serial numbers and slots are checked to make sure they are in the valid range. Mapping information is checked against the information in MappingSolutions.xml. etc.

Extra validation is done to determine which CNAMEs can be created or accessed. When a customer tries to create a CNAME, identifying information in the certificate is used to figure out which origin domains the customer owns. This information is pulled from ASAP using a SOAP call. If the customer owns only the foo.com origin domain, then they can create any CNAME that ends in .foo.com but not a CNAME that ends in .bar.com. They can also only edit and search for CNAMEs that end in .foo.com. Extra validation may also be done when deleting a CNAME. If it appears that the customer still has a CNAME pointing to a CDN service provider CNAME, the SOAP API preferably will refuse to delete the CNAME unless a force flag is set.

4. Portal GUI

A web based GUI running on the portal may use the CNAME SOAP API. If used, this GUI provides an intuitive and easy way for CDN customers, employees and permitted others to manage CNAMEs without using the SOAP API directly.

MUI

As noted above, the MUI component is responsible for pulling CNAME changes from the ExtAPI SOAP server, generating a package of configuration information, and pushing the package to the network (or backend). MUI monitors a query mechanism database (i.e., query tables) to determine the success or failure of loading the new configuration files, and it reports the results back to the SOAP server. Each CNAME package pushed to the backend preferably contains an XML file per domain (e.g., edgesuite.net, edgekey.net, upload.akamai.com and download.akamai.com, as set forth below), the mapping.xml file, and an index.xml file. The index.xml file contains the ID of the package and information about each of the files contained in the package.

1. MUI Daemons

The bulk of the work needed to pull CNAME configuration information and push it to the backend subsystem is done by a number of daemons, collectively called the "MUI daemons." They are illustrated in FIG. 4. The daemons preferably run at set intervals. At each interval they wake up, perform an action specific to that daemon, and sleep until the next interval. Each daemon acts as a stage in the pipeline that pushes metadata to the content delivery networks. Four of the daemons are of interest for CNAME tarball packages, namely: the Pull, Push, PushReport, and Sync daemons. Each of these are now described.

Pull Daemon—

The pull daemon 412 periodically polls the ExtAPI SOAP server for new CNAME changes. If changes exists, the pull daemon pulls a list of all CNAMEs from the SOAP server for a specific change. The SOAP server applies the changes and all earlier pending changes to the list of CNAMEs returned to the pull daemon 412. The pull daemon then generates all the XML configuration files needed by the backend. A CNAME tarball is created and the process of pushing a tarball is started. A relationship is maintained between the tarball and the change ID used when pulling the CNAMEs from the SOAP server.

In addition to checking for CNAME changes, the pull daemon 412 also periodically checks for changes to the mapping.xml file and updates the SOAP server with a set of the least loaded serial numbers if used. The pull daemon accesses mapping.xml through any convenient means. When a change to mapping.xml is made, the pull daemon 412 parses the file and updates the SOAP server using a SOAP API. The list of least loaded serial numbers preferably is obtained through a database link to an appropriate database that includes this data. The SOAP server uses this information when picking default serial numbers.

Push Daemon—

The push daemon 414 pushes tarballs of all types, including CNAME tarballs, to the network.

PushReport Daemon—

After a tarball has been submitted, the pushReport daemon 416 determines the status of the tarball. Preferably, this daemon uses query tables populated by the backend to determine if the contents of the tarball have been successfully validated by the backend. The pushReport daemon 416 then checks query tables to make sure the new DNS zones have been loaded by the CDN top level DNS servers. The end result is the tarball either succeeds or fails. If the pushReport daemon 416 is unable to determine the status after a given time, the tarball is failed.

Sync Daemon—

Once the pushReport daemon 416 determines the status of a tarball, it updates the SOAP server with the status of the change ID associated with the tarball. The SOAP server is then able to update its tables and give feedback to users. This is accomplished by the sync daemon 418.

Preferably, the MUI component keeps a history of CNAME tarballs. An interface may be provided by MUI to view the contents of past CNAME tarballs. If a failure is encountered at any point, email (or some other notification) is sent out to an appropriate entity. Preferably, MUI deals with only one tarball of a given type at a time. The pull daemon preferably does not pull another CNAME change until the status of the current tarball is determined. Preferably, there will not be more then one outstanding CNAME tarball at a time. CNAME tarballs will typically contain the global state of all CNAMEs. A tarball does not just contain the CNAMEs that changed, but contains all CNAMEs for all domains. Each tarball also contains the mapping.xml file. A tarball is totally independent of other tarballs.

Each XML file in the tarball typically contains version information. When the backend receives a new tarball, it uses this version information to decide which files need to be processed. If a file has not changed since the last seen tarball, then the backend does not process the file. In same cases it may be desirable to force the backend to load the files contained in a tarball no matter what the version is. For example, there could be an emergency that requires a previously deployed tarball to be pushed to the network again. To support this, an "emergency" tarball may be created. An emergency tarball is simply a tarball with an emergency attribute set in the index.xml file include in the tarball. MUI may provide an interface to select a previous CNAME tarball and perform an emergency push.

2. Handling Failures

As noted above, preferably the MUI component determines success or failure on a tarball basis. Each CNAME tarball can contain multiple CNAME changes that have been batched together. Preferably, the MUI component does not report a failure to the SOAP server if the tarball contained batched changes. Instead, the MUI component will request each change individually from the SOAP server and push tarballs containing individual changes. When a tarball with only a single change fails, the error information is much more useful.

The EDNS Backend Subsystem

Figure 5:
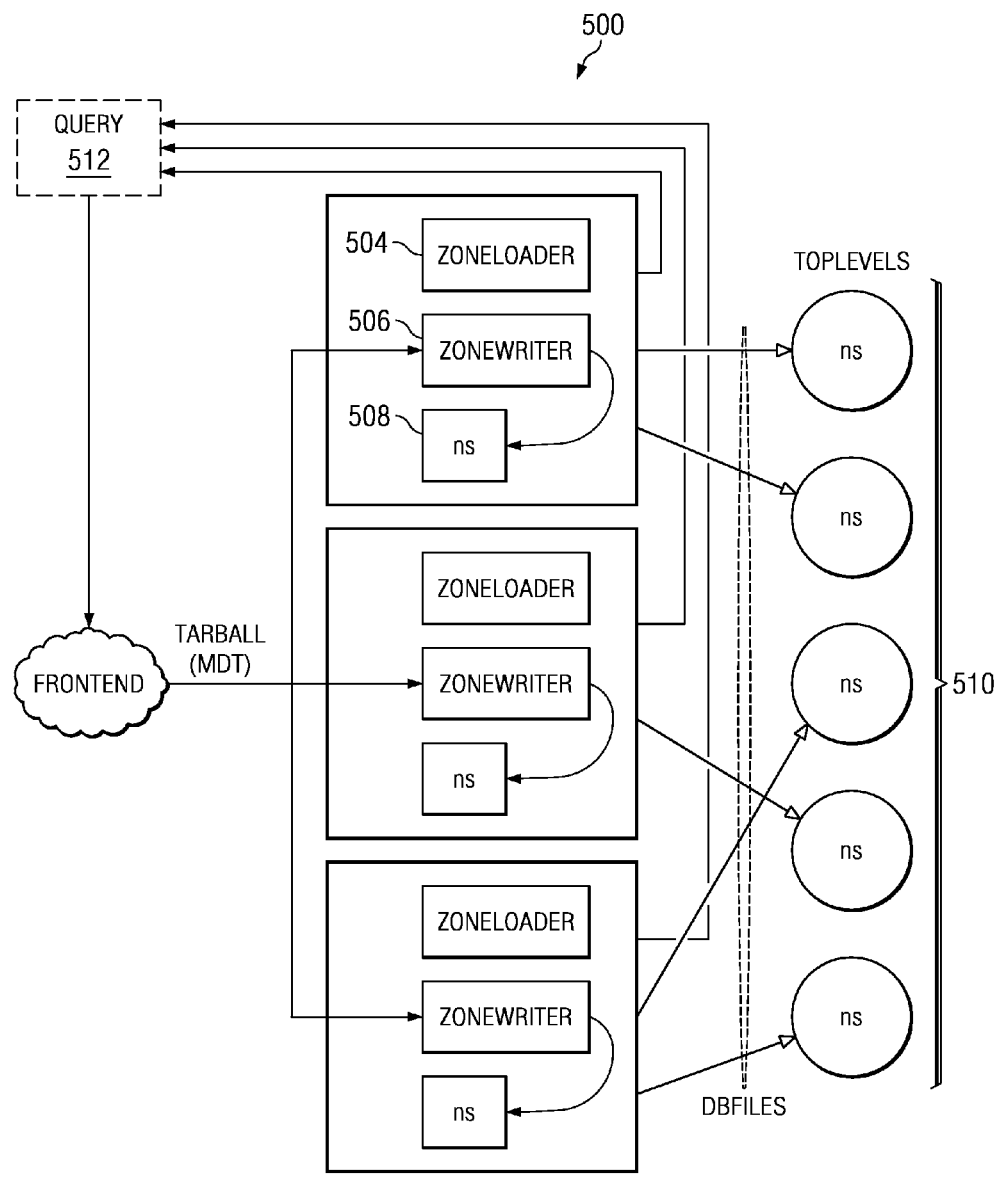
FIG. 5 is a detailed block diagram of the provisioning tool backend subsystem.

EDNS is a "secondary DNS" service. As illustrated in FIG. 5, the EDNS backend subsystem 500 typically comprises several "zoneloader" machines 502, each running a "zoneloader" process 504 that accepts configuration information (customer's zones and master name servers). The zoneloader process is instantiated as a zonewriter process 506, which instructs a local bind "named" process 508 to perform the necessary zone transfers, converts the files into an appropriate file format, which the top level name servers 510 expect, performs validation (including extensive testing against a local name server process), issues alerts in case of problems, and uploads the database files to the top level name servers 510. This infrastructure is naturally suited for CNAME provisioning.

1. Basic Zonewriter Processing Steps

The zoneloader machines receive one tarball at a time via MDT. If a new tarball is found, the machine preferably will try to process the package (i.e., open it, parse the contents, and so on). If anything goes wrong along the way (all the way to creating the final database files), preferably the entire package is rejected. While parsing the tarball package, preferably the machine will validate all inputs.

Once the contents of the tarball are considered good, updates are applied. To be efficient, preferably zonewriter will only process zones that have updates (based on timestamps). If there are preexisting database files, only updates are applied. If database files are persistent, the machine can detect if a new tarball contains missing records for a zone that were not explicitly deleted. If the same tarball is sent twice (having the same id), it will be rejected. If, however, an emergency flag is set (e.g., in the tarball index file), all efficiency steps are circumvented, and preferably the tarball is processed from scratch.

Once all updates are applied successfully to (temporary versions of) the database files, a suite of tests is performed. First, all contents of a dbfile are queried against a local name server process. This local name server process works just like a regular EDNS top level name server, except preferably it only listens on localhost. Preferably, the local name server process is configured with all db files so that problems or errors can be detected. Second, zonewriter will perform a test of all zone contents against the local name server to catch potential problems with db file updates.

Preferably, zoneloader and zonewriter keep persistent state. They may also process files in a temporary area.

2. Query Tables

The following are representative data structures for the query mechanism 512.

Authdnsheartbeat Table

EDNS processes (zoneloader, zonewriter, configloader) preferably report into the authdnsheartbeat table. This table includes the most recent dynamic configuration timestamp (in the case of zonewriter the tarball id) and cycle times.

Zoneloader Table

This table gives the status of individual zones (name of zone, loadtime, SOA information, number of records, status and a few other columns), published by both zoneloader and zonewriter. A "zonewriter" column may be added to distinguish between zoneloader and zonewriter zones. This table allows the service provider to find out basic information and write alerts to find stale zones, etc.

Dnsconfig Table

Preferably, only zonewriter publishes to this table, reporting the id and status of the most recently seen tarball. The frontend uses this information to find out if a tarball was successful or rejected, before pushing new tarballs.

Zoneloaderalerts Table

Both zoneloader and zonewriter may publish internal alerts to this table.

Mixed Mapping Solutions

It may be desirable to add support for mixed mapping solutions. Mixed mapping solutions allow the CDN service provider to hand out a different CNAMEs based on given information (e.g. geo location, bandwidth, network type, and the like). This functionality may require the creation of non-default trees. The tree will be another input into zonewriter.

To safely support these mixed maps, the following technique may be used: for any mixed-map CNAME a "cross-zone" CNAME is created in the main zone (e.g. "edgeservice.net") into a subzone (e.g. "mixedmap1.edgeservice.net"). The subzone (together with a corresponding tree) contains the actual to-be-configured CNAMEs. The cross-zone CNAME does not cause any significant performance overhead, since the same top level name server process will resolve it. The following is an example: "my.com" is configured to use the "mixedmap1" mapping solution, which translates into the "g" map for the United States and the "x" map everywhere else. The edgeservice.net zone contain the CNAME "my.com.edgeservice.net CNAME my.com.mixedmap1.edgeservice.net". The subzone "mixedmap1.edgeservice.net" contains the actual "g" or "x" map CNAMEs in different region stanzas based on the tree mapping.

The provisioning system can be bootstrapped with currently existing CNAMEs. In other words, an entry needs to be added to the "live" table in the ExtAPI database for each CNAME currently in use. This is a straightforward process with the one exception of how to handle default values. Service CNAMEs can have their map and TTL values set to use the default values specified in mapping.xml. Changing the default map in mapping.xml results in a change to all CNAMEs that are set to use the default map. During bootstrapping, CNAMEs that are using the default map can have the map set explicitly, or it can have the map set to use the default map. If set explicitly, subsequent changes to mapping.xml will not change the CNAME. Preferably, the same applies to TTL values.

Figure 6:
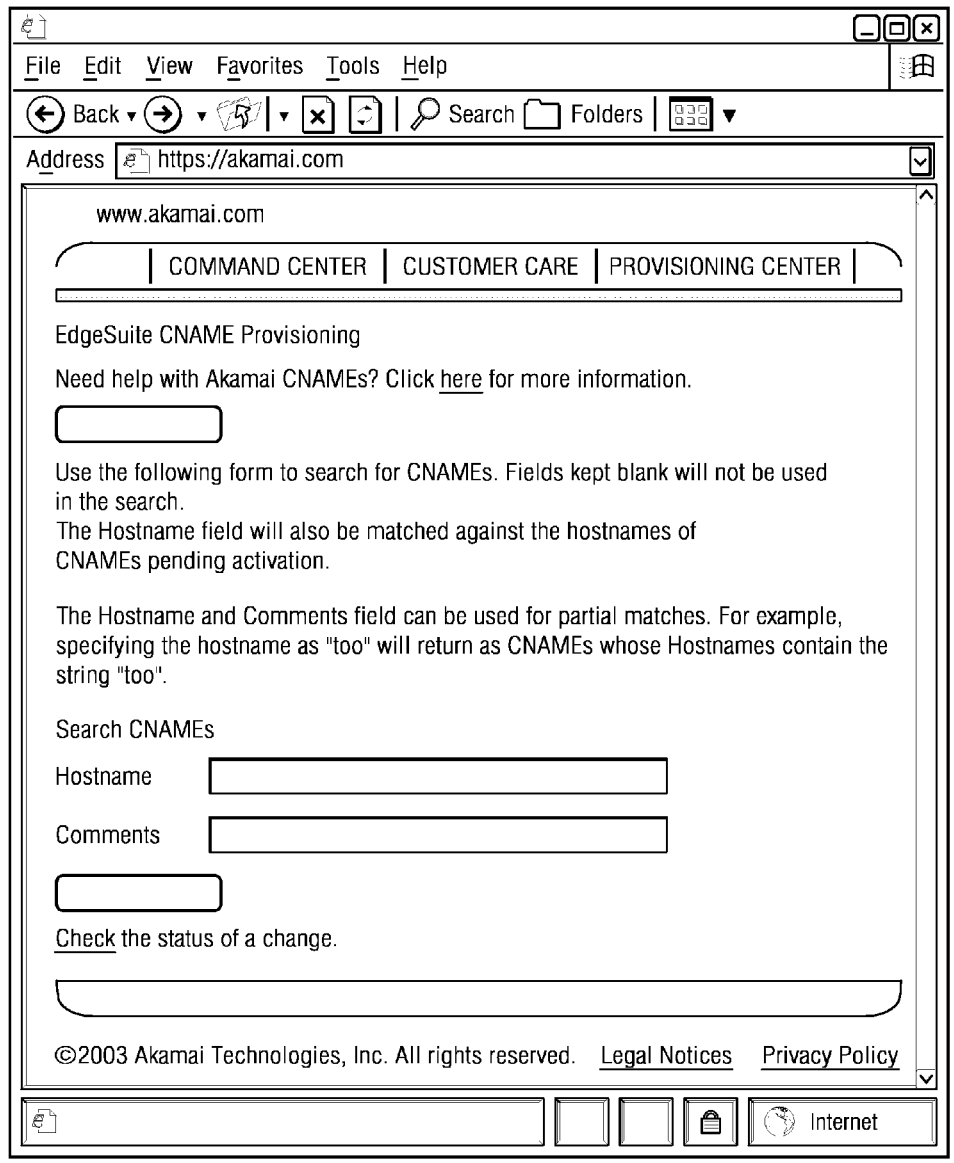
FIGS. 6-7 are an illustrative Web-based GUI to facilitate CNAME provisioning according to this disclosure.
Figure 7:
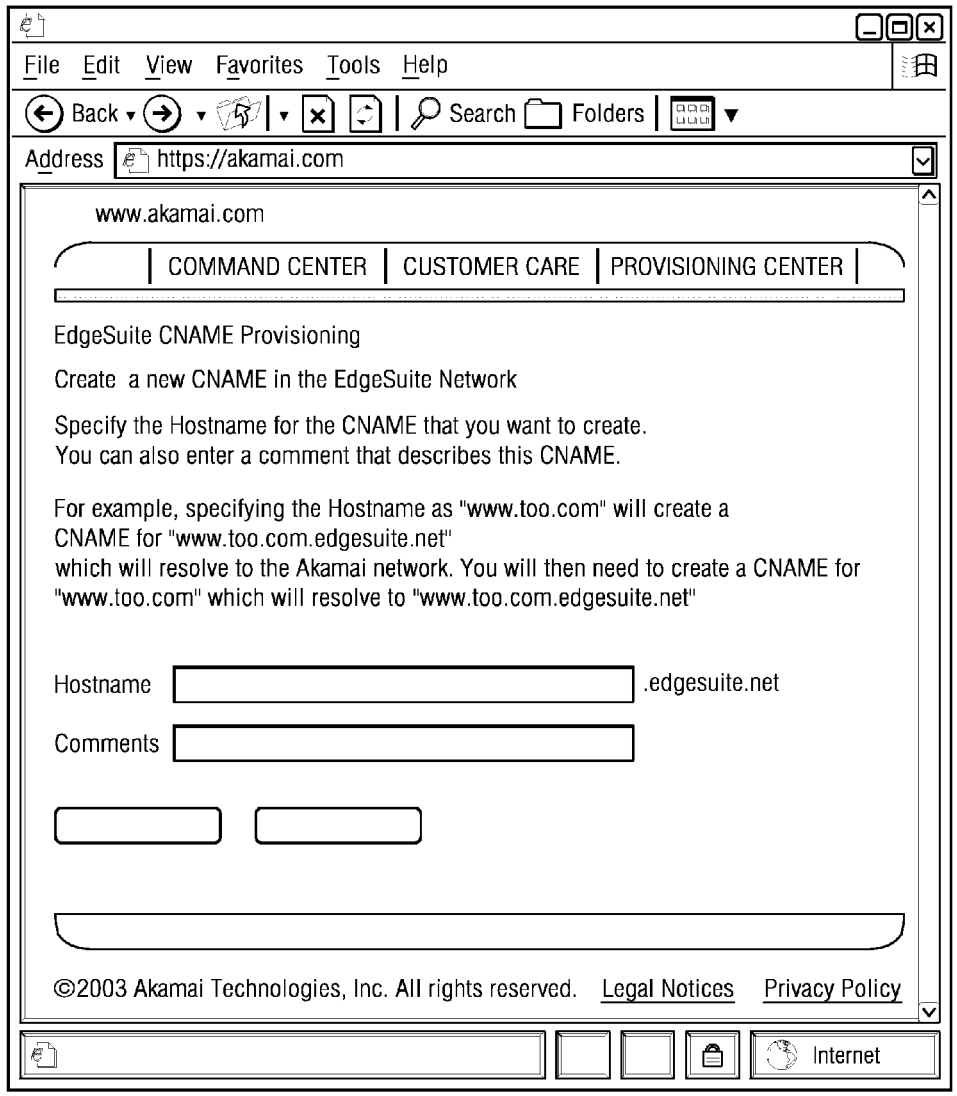

FIGS. 6-7 illustrative representative user interface screens for the provisioning tool. Any convenient interface may be used, of course.

The core infrastructure is not limited to only handling CNAMEs; the CDN service provider can use this infrastructure to handle any kind of DNS information. Another potential application is to dynamically update DNS information used in the CDN.

Data Model

XML may be used to capture all the configuration information for different types of CNAMEs that may be used by the CDN service provider to provision its service offerings.

The following are several sample configurations (© 2003 Akamai Technologies, Inc.):

```
Zone "edgesuite.net"
<zone name="edgesuite.net" time="1037648257" version="1.0">
        <map name="a;g.akamai.net" time="1037648257">
                <edgesuite-cname name="global.bnn.net" ttl="600" serial="163" time="1037648257"/>
                <edgesuite-cname name="global.nsn.net" ttl="1200" serial="83" time="1037648257"/>
                <edgesuite-cname name="earthquake.ushs.gov" ttl="3600" serial="218" alias="a;gb.akamai.com" time="1037648257"/>
        </map>
        <map name="a;x.akamai.net" time="1037643357">
                <edgesuite-cname name="second.bnn.net" ttl="28400" serial="163" time="1037614387"/>
                <edgesuite-cname name="third.bnn.net" ttl="28400" serial="163" time="1037643357" deleted="yes"/>
        </map>
        <map name="edgesuite.blend1" time="1037642288">
                <edgesuite-cname name="special.bnn.net" ttl="28400" serial="263" time="1037642288">
        </map>
        <cname name="a1-1.origin.logitep.com" ttl="28400" target="origin.logitep.com" timestamp="1037634825"/>
        <cname name="a1-2.origin.logitep.com" ttl="28400" target="origin.logitep.com" timestamp="1037634825"/>
</zone>
```

-continued

This would result in the following CNAMEs in the "edgesuite.net" zone:
```
        global.bnn.net          600         IN CNAME    a163.g.akamai.net
        global.nsn.net          1200        IN CNAME    a83.g.akamai.net
        earthquake.ushs.gov     3600        IN CNAME    a218.gb.akamai.com
        second.bnn.net          28400       IN CNAME    a163.x.akamai.net
        a1-1.origin.logitep.com 28400       IN CNAME    origin.logitep.com
        a1-2.origin.logitep.com 28400       IN CNAME    origin.logitep.com
```
Zone "edgekey.net" (ESSL)
<zone name="edgekey.net" time="1037648257" version="1.0">
    <map name="e;g.akamaiedge.net" time="1037648257">
        <essl-cname name="www99.merizon.com" ttl="86400" slot="1" time="1037648257"/>
        <essl-cname name="www.planetwheels.com" ttl="86400" slot="2" time="1037648257"/>
        <essl-cname name="my.deagate.com" ttl="86400" slot="2" alias="e;gb.akamaiedge.net" time="1037648257"/>
        <essl-cname name="p0.r2247.johnsson" ttl="86400" slot="6" regionid="2321" time="1037648257"/>
        <essl-cname name="p1.r2247.johnsson" ttl="86400" slot="6" regionid="2408" time="1037648257"/>
    </map>
    <map name="e;na.akamaiedge.net" time="1037648257">
        <essl-cname name="www.vssecret.com" ttl="14400" slot="8" time="1037648257"/>
    </map>
    <cname name="strange.example.com" ttl="28400" target="origin.strange.example.com"/>
</zone>
This would result in the following CNAMEs in the "edgekey.net" zone:
```
        www999.merizon.com       86400      IN   CNAME    e1.g.akamaiedge.net
        www.planetwheels.com     86400  IN  CNAME    e2.g.akamaiedge.net
        my.deagate.com           86400      IN   CNAME    e2.gb.akamaiedge.net
        p0.r2247.johnsson        86400      IN   CNAME    e6.w2321g.akamaiedge.net
        p1.r2247.johnsson        86400      IN   CNAME    e6.w2408g.akamaiedge.net
        www.vssecret.com   14400     IN    CNAME   e8.na.akamaiedge.net
        strange.example.com      28400      IN   NAME     origin.strange.example.com
```
ACS zones "download.akamai.com" and "upload.akamai.com"
<zone name="download.akamai.com" time="1037648257" version="1.0">
    <cname name="bnn" ttl="300" target="http.us.storage.akadns.net"/>
    <cname name="http3038.bnn" ttl="300" target="http3038.storage.akadns.net"/>
    <cname name="http3039.bnn" ttl="300" target="http3039.storage.akadns.net"/>
    <cname name="foo" ttl="300" target="http.eu.storage.akadns.net" delete="yes"/
>
</zone>
This would result in these CNAMEs in the "download.akamai.com" zone:
```
        bnn              300       IN   CNAME    http.us.storage.akadns.net
        http3038.bnn     300       IN   CNAME    http3038.storage.akadns.net
        http3039.bnn     300       IN   CNAME    http3039.storage.akadns.net
```
mapping.xml
Both regular and mixed mapping solutions are captured in the "mapping.xml" file.
<mappingSolutions time="1234" version="1.0">
   <edgeSuiteMaps default="Standard Edge">
      <solutionType name="Standard Edge" default="a;x.akamai.net">
         <mappingSolution name="a;g.akamai.net" desc="general traffic map" defaultTTL="21600">
            <aliases>
               <alias name="a;ga.akamai.net"/>
               <alias name="a;gb.akamai.net"/>
               <alias name="a;gc.akamai.net"/>
            </aliases>
         </mappingSolution>
         <mappingSolution name="a;x.akamai.net" desc="c map"/>
      </solutionType>
      <solutionType name="Custom Maps">
         <mappingSolution name="edgesuite.mixed1" desc="North America map" type="mixedMap" defaultTTL="21600">
            <mixedMap default="a;x.akamai.net">
               <mappingInstance name="a;g.akamai.net">
                  <geoLocations>
                     <geo country="US"/>
                     <geo country="CA"/>

```
            </geoLocations>
            <accessType name="broadband"/>
        </mappingInstance>
        <mappingInstance name="a;h.akamai.net">
            <geoLocations>
                <geo country="US"/>
                <geo country="CA"/>
            </geoLocations>
        </mappingInstance>
        <mappingInstance name="a;h.akamai.net">
            <accessType name="broadband"/>
        </mappingInstance>
      </mixedMap>
    </mappingSolution>
  </solutionType>
</edgeSuiteMaps>
<esslMaps>
    <solutionType name="Essl Edge">
        <mappingSolution name="e;g.akamaiedge.net" desc="general traffic map" defaultTTL="21600">
            <aliases>
                <alias name="e;gb.akamaiedge.net"/>
                <alias name="e;gc.akamaiedge.net"/>
            </aliases>
        </mappingSolution>
    </solutionType>
</esslMaps>
</mappingsolutions>
```

The following are representative API methods.

Overview

Allows CDN customers to create, delete, and modify CNAMES for the content delivery network.

Methods createCNAME

Creates the given CNAME for use with the content delivery network.

| Name | Type | Notes |
|------|------|-------|
| Input parameters: | | |
| cname | akacnamedt:CNAME | The CNAME structure filled in by the caller. Only the FQDN needs to be specified. |
| Output parameters: | | |
| changeID | xsd:int | The ID for the resulting change request. A fault will be thrown in the case of a failure. | deleteCNAME

Deletes the given CNAME.

| Name | Type | Notes |
|------|------|-------|
| Input parameters: | | |
| cname | akacnamedt:CNAME | The CNAME structure filled in by the caller. Only the FQDN needs to be specified. |
| Output parameters: | | |
| changeID | xsd:int | The ID for the resulting change request. A fault will be thrown in the case of a failure. | editCNAME

Modifies the attributes of the given CNAME.

| Name | Type | Notes |
|------|------|-------|
| Input parameters: | | |
| cname | akacnamedt:CNAME | CNAME structure containing the FQDN of the CNAME to edit. The attribute array should contain the new values of the modified attributes. |
| Output parameters: | | |
| changeID | xsd:int | The ID for the resulting change request. A fault will be thrown in the case of a failure. | getChangeStatus

Returns the status of a change that is pending in the content delivery network.

| Name | Type | Notes |
|------|------|-------|
| Input parameters: | | |
| changeID | xsd:int | The change id associated with the change |
| Output parameters: | | |
| status | xsd:string | The status of the specified change | searchCNAMEs

Returns all the CNAMEs matching the search criteria and owned by the caller.

| Name | Type | Notes |
|---|---|---|
| | Input parameters: | |
| cname | akacnamedt:CNAME | The CNAME structure used for the search criteria. The hostname in the CNAME structure can be used as a key in the search. For example, setting the hostname to 'foo' will search all CNAMEs that contain the string 'foo' in the hostname. Keeping the hostname empty will search for all CNAMEs matching the specified attributes. The comments attribute can also be specified partially |
| | Output parameters: | |
| cnames | akacnamedt:ListOfCNAME | The list of CNAMEs matching the search criteria. |

Having described our invention, what is now claimed is set forth below:

1. A system for provisioning DNS canonical names in a distributed network on behalf of given entities that use the distributed network, wherein the distributed network includes a set of one or more name servers, comprising:

a first subsystem executing in a hardware element and comprising a management server, an associated database, and a web portal including a graphical user interface, by which given entities that use the distributed network identify canonical name change requests, the management server having an associated application programming interface (API) that exports a set of methods that enable a given entity, using the graphical user interface, to create, delete and/or edit a canonical name for use in the distributed network, wherein a given canonical name change request is associated with a given action selected from a set of actions that include creating, editing and deleting canonical names that are used in the distributed network, the first subsystem further including code responsive to entry of a single hostname in the graphical user interface for generating at least first and second canonical names for use in the distributed network, wherein the first and second canonical names are associated with one of: given geographical regions, given network access types, and given service types; and a second subsystem executing in a hardware element and in communication with the first subsystem to receive information from the first subsystem and, upon validation, to convert the information into one or more DNS zone files, and to install the DNZ zone files to the one or more name servers, the information including the canonical name entry.

2. The system as described in claim 1 wherein the first subsystem includes a portal through which the given entities identify canonical name change requests.

3. The system as described in claim 1 wherein the second subsystem provides the information to the one or more name servers via a zone transfer.

4. The system as described in claim 1 wherein the second subsystem receives the information from the first subsystem periodically.

5. The system as described in claim 1 wherein the second subsystem reports given status information to the first subsystem.

6. The system as described in claim 1 further including a mechanism responsive to entry of the hostname for validating whether a canonical name to be generated from the hostname meets a given criteria.

7. The system as described in claim 6 wherein the given criteria is that the given entity is authorized to associate given content with the hostname.

8. The system as described in claim 1 wherein at least one method of the set of methods enables the given entity to edit more than one canonical name at a time.

9. The system as described in claim 1 wherein the distributed network is a content delivery network.

10. A computer program product in a non-transitory computer readable medium for use in provisioning DNS canonical names in a distributed network on behalf of given entities that use the distributed network, comprising:

a management server, an associated database, and a web portal including a graphical user interface, by which given entities identify canonical name change requests, the management server having an associated application programming interface (API) that exports a set of methods that enable a given entity, using the graphical user interface, to create, delete and/or edit a canonical name for use in the distributed network, wherein a given canonical name change request is associated with a given action selected from a set of actions that include creating, editing and deleting canonical names that are used in the distributed network;

program code executing in a hardware element and responsive to entry of a single hostname in the graphical user interface for generating at least first and second canonical names for use in the distributed network, wherein the first and second canonical names are associated with one of: given geographical regions, given network access types, and given service types; and a second subsystem executing in a hardware element and in communication with the first subsystem to receive information from the first subsystem and, upon validation, to convert the information into one or more DNS zone files, and to install the DNZ zone files to the one or more name servers, the information including the canonical name entry.

* * * * *